United States Patent
Reimelt et al.

(10) Patent No.: US 6,847,214 B2
(45) Date of Patent: Jan. 25, 2005

(54) DEVICE FOR DETERMINING THE LEVEL OF CONTENTS IN A CONTAINER

(75) Inventors: Ralf Reimelt, Freiburg (DE); Herbert Schroth, Schopfheim (DE)

(73) Assignee: Endress + Hauser GmbH + Co. KG (DE)

( * ) Notice: Subject to any disclaimer, the term of this patent is extended or adjusted under 35 U.S.C. 154(b) by 0 days.

(21) Appl. No.: 10/257,394

(22) PCT Filed: Apr. 18, 2001

(86) PCT No.: PCT/EP01/04385

§ 371 (c)(1),
(2), (4) Date: Mar. 24, 2003

(87) PCT Pub. No.: WO01/79788

PCT Pub. Date: Oct. 25, 2001

(65) Prior Publication Data

US 2004/0017200 A1 Jan. 29, 2004

(30) Foreign Application Priority Data

Apr. 18, 2000 (DE) .......................... 100 19 129

(51) Int. Cl.$^7$ .............................................. G01R 27/32
(52) U.S. Cl. .................................... 324/644; 73/290 V
(58) Field of Search ...................... 324/644; 73/290 V, 73/290 R

(56) References Cited

U.S. PATENT DOCUMENTS

| | | | | |
|---|---|---|---|---|
| 4,470,296 A | * | 9/1984 | Kobayashi et al. ........... 73/113 |
| 4,994,682 A | * | 2/1991 | Woodside .................... 250/577 |
| 5,651,286 A | * | 7/1997 | Champion et al. ......... 73/290 V |
| 5,656,774 A | * | 8/1997 | Nelson et al. ............ 73/290 V |
| 5,747,689 A | * | 5/1998 | Hampo et al. ............ 73/304 C |
| 5,887,479 A | * | 3/1999 | Swanson ................. 73/290 R |
| 5,943,908 A | * | 8/1999 | Innes et al. ............... 73/290 R |
| 5,982,290 A | * | 11/1999 | Berger et al. ............... 340/618 |
| 6,068,672 A | * | 5/2000 | Watson et al. ................. 44/629 |
| 6,138,508 A | * | 10/2000 | Hannan et al. ........... 73/304 C |

FOREIGN PATENT DOCUMENTS

| | | |
|---|---|---|
| EP | 0834722 A2 | 4/1998 |
| EP | 0882955 A1 | 12/1998 |
| EP | 0922942 A1 | 6/1999 |
| EP | 0971213 A2 | 1/2000 |
| EP | 1058341 A1 | 12/2000 |
| RO | 106294 B1 * 3/1993 ........... G01F/23/30 |

* cited by examiner

*Primary Examiner*—Charles H. Nolan, Jr.
(74) *Attorney, Agent, or Firm*—Bacon & Thomas, PLLC

(57) ABSTRACT

A level sensor which is capable of largely eliminating the influence of structural parts and/or the formation of deposits on the measuring accuracy and on the measuring sensitivity of the level sensor. There is provided, a launching unit which has at least one length, which essentially corresponds to the distance from the container wall to the lower edge of the structural part, and which is positioned in such a manner that a transition area launching unit conductive element is located approximately in the plane of the lower edge of the structural part, with the diameter of the opening of the launching unit on the transition launching unit conductive element is in the order of magnitude of the wavelength of the high-frequency measurement signals.

20 Claims, 6 Drawing Sheets

DEVICE FOR DETERMINING THE LEVEL OF CONTENTS IN A CONTAINER

FIELD OF THE INVENTION

The invention relates to a device for determining and for monitoring the level of contents in a container, in which on the container at least one structural part is provided, on which or in whose surroundings at least the sensor-associated part of the device is mounted, having a signal generating unit, which generates high-frequency measurement signals, having an input unit and a conductive element, the measurement signals being input to the conductive element via the input unit, and having a receiving/evaluating unit, which directly or indirectly via the transit time of the measurement signals, reflected from the surface or boundary face of the contents, determines the level of the contents or the location of the boundary face in the container as generically defined by the preamble to the independent claims. It is understood that the device is also suitable for determining the location of at least one boundary face between two phases of a medium or between two media.

BACKGROUND OF THE INVENTION

For determining the level of contents in a container, measuring systems are used that measure different physical variables. On the basis of these variables, the desired information about the level is then derived. Besides mechanical scanners, capacitive, conductive or hydrostatic measuring probes are used, as are detectors that operate on the basis of ultrasound, microwaves, or radioactive radiation.

In many fields of use, such as petrochemicals, chemistry and the food industry, highly accurate measurements of the level of liquids or bulk goods in containers (tanks, silos, etc.) are needed. Increasingly, sensors are therefore used in which brief electromagnetic high-frequency pulses (TDR methods or pulse-radar methods) or continuous frequency-modulated microwaves (such as FMCW-radar methods) are input into a conductive element or a waveguide and carried into the container where the contents are stored by means of the waveguide. The known variants can be considered as the waveguide: surface waveguides on the Sommerfeld or Goubau principle, or Lecher waveguides.

In physical terms, in this measuring method, the effect is exploited that at the boundary face between two different media, such as air and oil or air and water, some of the guided high-frequency pulses or the guided microwaves carried are reflected because of the abrupt change (discontinuity) in the dielectric constants of both media and is returned back to a receiver by way of the conductive element. The reflected component (or useful echo signal) is all the greater, the greater the difference between the dielectric constants of the two media. The distance from the surface of the contents can be determined from the transit time of the reflected component of the high-frequency pulses or CW signals (echo signals). If the empty distance of the container is known, then the level of contents in the container can be calculated. If a boundary face determination is to be performed, then the location of the boundary face can be determined from the outcomes of the measurement.

Sensors with guided high-frequency signals (pulses or waves) are distinguished over sensors that freely broadcast high-frequency pulses or waves (free-field microwave systems or FMR, also called "genuine radar systems") in having a substantially greater echo amplitude. The reason for this is that the power flow is effected quite purposefully along the waveguide or conductive element. Moreover, sensors with guided high-frequency signals have greater measuring sensitivity and measuring accuracy at close range than freely broadcasting sensors.

The measuring accuracy and measuring sensitivity of sensors that use surface or Lecher waveguides is worsened considerably if the transition region from the input unit to the conductive element is located in the region of a container connection stub or—in general terms—in the region of a structural part that is disposed in the container. If that is the case, then there is the risk that the portion of the radiation that is not guided—as desired—in the direction of the surface of the contents but instead is broadcast toward the side will lead to transverse resonances (or in the case of a connection stub, to void resonances). Moreover, because of the surface waves along the conductive element, longitudinal resonances can develop. The interfering echo signals that this causes can become so strong that the actual useful echo signal is no longer detectable. Moreover, if longitudinal resonances occur from reflection in the propagation direction, the attenuation of the amplitude of the surface wave and hence of the useful echo signal is especially problematic.

One problem that occurs in particular—but not exclusively—when the sensor is secured in the connection stub of a container is the development of deposits. These occur especially in containers that are filled with hot media or in containers located outdoors that are exposed to major temperature fluctuations. When dust additionally develops in the container, a deposit then forms that can grow over time to such an extent that the transmission of the surface waves is entirely suppressed, or that at least interfering echo signals at close range are created.

SUMMARY OF THE INVENTION

An object of the invention is to provide a device which is capable of largely eliminating the influence that a structural part and/or the formation of deposits on the sensor has on the measuring accuracy and measuring sensitivity of the sensor.

In a first embodiment of the device of the invention, this object is attained in that the input unit has at least a length that corresponds essentially to the spacing from the container wall to the lower edge of the structural part and is positioned such that the transition region "input unit conductive element" is located approximately in the plane of the lower edge of the structural part; and that the diameter of the opening of the input unit at the transition region "input unit—conductive element" is on the order of magnitude of the wavelength of the high-frequency measurement signals. Because the input unit is lengthened according to the invention, the structural parts are located outside the region into which electromagnetic energy is broadcast. The generation of void resonances and interference signals is therefore largely prevented. A further essential characteristic of the invention is that the opening or aperture of the input unit is on the same order of magnitude as the wavelength of the measurement signals. This assures that the input unit has a pronounced directional characteristic, and the measurement signals are for the most part input to the conductive element and thus are not extended back in the opposite direction along the input unit or broadcast laterally.

In an alternative embodiment of the device of the invention, the object is attained in that the input unit has a predetermined length, and is positioned in the container such that the opening of the input unit, pointing in the direction of the medium, has a certain spacing from the corresponding container wall; and that the diameter of the opening of the input unit at the "input unit—conductive element" transition is on the order of magnitude of the wavelength of the high-frequency measurement signals. This arrangement is especially advantageous if, although no structural parts that could adversely affect the propagation of the measurement signals are located in the vicinity of the input unit, nevertheless there is still an increased risk that from condensate formation and dust production in the container interior, deposits could form on the input unit. The length and input shifts the transition region between the input unit and the conductive element to a point located farther in the interior of the container, which experience teaches is less vulnerable to the development of deposits.

An advantageous version of the two embodiments of the invention recited above provides that the input unit has an inner conductor and an outer conductor; and that between the inner conductor and the outer conductor, in at least a partial region, a dielectric material is disposed. Since the field symmetry in the coaxial cable is quite similar to the field symmetry in a Sommerfeld or Goubau conductor, at the transition region "input unit—conductive element" only slight field interference occurs, which is expressed in a high transmission rate and thus high measuring sensitivity. Because of the low proportion of reflected measurement signals, the interference at close range is also low, since multiple reflections between locally lengthy interference points are avoided. The interference points are on the one hand the plug on the electronics, for instance, and on the other the transition region "input unit—conductive element". Other advantages of this version are considered to be that the dielectric material seals off the level sensor from the container, and also serves to mechanically retain the inner conductor. If condensate formation in the voids of the input need not be feared, then it is possible, for reasons of cost, to dispense with completely filling the three-dimensional region between the inner conductor and the outer conductor with dielectric material.

It has moreover proved especially advantageous if the dielectric material of the input unit is essentially tapered from the transition region "input unit—conductive element" onward, and an upper portion of the conductive element is disposed approximately in the region of the longitudinal axis of the taper. The tapered form of the dielectric material at the same time has several advantages:

1. Because of the tapered form, the phase front at the transition region "input unit—conductive element" is changed in such a way that an improved directional effect is obtained. Thus on the one hand the undesired broadcasting to the side and to the back is reduced, while on the other hand the input to the waveguide is improved. Because of the first above advantage, the incidence of interfering echoes and so-called connection stub ringing is reduced, while because of the second advantage above, an increase in the amplitude of the useful echo signal is attained.

2. Because of the tapered shape, it is attained that signal components reflected from different points of the taper interfere with one another destructively, which leads to a reduction in the block distance. The term "block distance" is understood to be the minimum measurable distance of a level sensor.

3. Because of the tapered shape, the outflow of condensate droplets is facilitated; this lessens the risk of the formation of deposits.

In a preferred version of the two variants named above for attaining the object of the invention, it is proposed that the outer conductor of the input unit changes over, essentially from the transition region "input unit conductive element" onward into a horn-shaped element, and an upper portion of the conductive element is disposed approximately in the region of the longitudinal axis of the taper. The advantages of this version are as follows:

1. Because of the enlarged aperture of the horn, the directional action is improved considerably.

2. The horn reduces field distortion in the transition region "input unit—conductive element", since the outer conductor does not drop away abruptly but instead widens continuously in diameter. Ideally, the diameter is so large that the surface wave mode already detaches from the outer conductor. As a result, there is little field interference at the transition region "input unit—conductive element".

3. Condensate can flow off on the outside of the horn, so that the cross section within which the signal is guided is not closed by deposits.

In a third embodiment of the device of the invention, the object is attained in that the transition region "input unit—conductive element" is located essentially in the plane of the container wall; the input unit has an inner conductor and an outer conductor; that between the inner conductor and the outer conductor, in at least a partial region, a dielectric material is disposed; and the dielectric material of the input unit is essentially tapered from the transition region "input unit—conductive element" onward, and an upper portion of the conductive element is disposed approximately in the region of the longitudinal axis of the taper. In this embodiment as well, the diameter of the aperture of the input unit is preferably on the order of magnitude of the wavelength of the measurement signals.

In a variant of the device of the invention, the object is attained in that the transition region "input unit conductive element" is located essentially in the plane of the container wall; the input unit has an inner conductor and an outer conductor; that between the inner conductor and the outer conductor, in at least a partial region, a dielectric material is disposed; and the outer conductor of the input unit changes over, essentially from the transition region "input unit—conductive element" onward into a horn-shaped element, and an upper portion of the conductive element is disposed approximately in the region of the longitudinal axis of the taper. Once again, preferably the diameter of the aperture of the input unit is on the order of magnitude of the wavelength of the measurement signals.

The advantages of these last two versions, with a taper or a horn-shaped element, have already been explained above. Both versions are preferably used whenever there are no interfering structural parts positioned in the vicinity of the device of the invention, yet it is important not to dispense with the advantages of the invention, particularly with a view to improved directional action, optimized transmission, and reduced deposit formation. Because the measurement signals are input to the conductive element by means of the horn-shaped element and/or by means of a taper, however, an adequately good directional action is attained even if "interference points" can be found in the immediate vicinity of the transition region "input unit—conductive element". It is naturally not unimportant here that a taper and/or a small horn-shaped element is less expensive than a "artificially" lengthened input unit.

A preferred version of the two variants named above of the device of the invention therefore provides that the transition region "input unit—conductive element" is positioned essentially in the plane of the top side of a structural part, in particular a connection stub, provided on the container.

In the fifth embodiment of the device of the invention, the object is attained in that in the region of the side walls of the structural part and in the region of the underside of the structural part, a conductive material is disposed; and that the transition region "input unit conductive—element" is positioned approximately in the plane in which the lower edge of the structural part is located. If the structural part is for instance a connection stub, then it is attained by this version that no electromagnetic energy can get into the connection stub. Consequently, no void resonances are generated, either, which has a favorable effect on the block distance. Moreover, this version reduces the risk of deposit formation in the critical region of the TDR sensor to a minimum.

An advantageous refinement of the device of the invention recited above proposes that a cup-shaped insert part is insertable into the connection stub, and the insert part is coated on at least one side with a conductive material, or the insert part is made from a conductive material.

In an advantageous refinement of the device of the invention, an opening for receiving the level sensor is provided on the underside of the insert part. This makes it possible to use the same measuring instrument for different installation situations. Only the cup has to be adapted to the dimensions of the connection stub.

Moreover, one version of the device of the invention provides a cover part, which closes off the top side of the connection stub and of the insert part. This protects the electronics of the measuring instrument, since no dirt or water, for instance, can collect in the top. Moreover, even with narrow connection stubs, it is possible to mount the level sensor in such a way that the indicator and/or control elements of the sensor remain accessible.

In a sixth embodiment of the device of the invention, the object is attained in that the input unit has a length which is essentially equivalent to the spacing from the container wall to the lower edge of the structural part; that the input unit is positioned such that the transition region "input unit—conductive element" is located approximately in the plane of the lower edge of the structural part; and that disposed on the underside of the connection stub in the transition region "input unit—conductive element" is a platelike element, which at least on the side toward the medium in the container is electrically conductive. This variant of the invention is considered especially economical.

An advantageous refinement of the device of the invention, in combination with the variant described above, provides electrical connecting elements, which are disposed in the region of the outer edges of the platelike element and in the region of the connection stub. The preferably resilient contact elements assure a high-frequency-tight closure between the plate and the connection stub. Consequently, the risk that some of the energy of the transmitted signals will be reflected back into the connection stub and there induce the highly unwanted void resonances, is quite low.

In a seventh embodiment of the device of the invention, the object is attained in that the transition region "input unit—conductive element" is disposed in the plane in which the top side of the structural part is located; that the conductive element is modified, approximately over the length of the structural part or over the length that is equivalent to the distance between the corresponding container wall and the lower edge of the structural part, in such a way that in this region virtually no interactions occur between the measurement signals, carried along the conductive element, and the structural part.

An advantageous refinement of the device of the invention provides that the conductive element, over the length that is equivalent to the distance between the corresponding container wall and the lower edge of the structural part, is made from a material of low electrical conductivity and/or high magnetic permeability.

It is also provided that the surface of the conductive element, over the length of the structural part or over the length that is equivalent to the distance between the corresponding container wall and the lower edge of the structural part, has a roughened surface structure. Alternatively or in addition, it is provided the surface of the conductive element, over the length of the structural part or over the length that is equivalent to the distance between the corresponding container wall and the lower edge of the structural part, has a surface structure by which the longitudinal inductance of the conductive element is increased. As an example, a helical surface structure can be named.

One advantageous version of the device of the invention is considered to be that the conductive element, over the length of the structural part or over the length that is equivalent to the distance between the corresponding container wall and the lower edge of the structural part, has an insulating layer, whose magnetic and/or dielectrical properties are dimensioned such that the length of the electromagnetic fields is limited to the region at close range to the conductive element.

The aforementioned versions are distinguished by the fact that the field length is reduced in a targeted way in those regions where there is a risk of an unwanted interaction with built-in fittings, but not over the remaining length of the conductive element. Here, especially if deposits form on the conductive element, a short field length would lead to severe damping of the measurement signals.

In an eighth embodiment of the device of the invention, the object is attained in that the transition region "input unit—conductive element" is disposed in the plane of the container wall; that the conductive element, at least in the upper region, is made from a material of low electrical conductivity and/or high magnetic permeability; and/or that the conductive element at least in the upper region has a roughened surface structure; and/or that the conductive element at least in the upper region has a surface structure by which the longitudinal inductance of the conductive element is increased; and/or that the conductive element at least in the upper region has an insulating layer, whose magnetic and/or dielectric properties are dimensioned such that the length of the electromagnetic fields is limited to the region at close range to the conductive element.

These variants of the embodiment of the invention have essentially two decisive advantages:

The directional action is improved, since because of the lesser field length, the aperture is effectively increased and the directional characteristic is improved. Thus there are fewer problems from electromagnetic fields broadcast laterally into the container, which after multiple reflections in the container could cause an interfering background. Moreover, because of the lesser field length of the measurement signals traveling along the conductive element, the abrupt change in wave resistance at the transition from the input unit to the conductive element is ameliorated. This is expressed in a higher transmission rate, and thus a lower reflection rate, of the measurement signals.

BRIEF DESCRIPTION OF THE DRAWINGS

The invention will be described in further detail in conjunction with the following drawings. Shown are.

DESCRIPTION OF THE PREFERRED EMBODIMENTS

Figure 1:
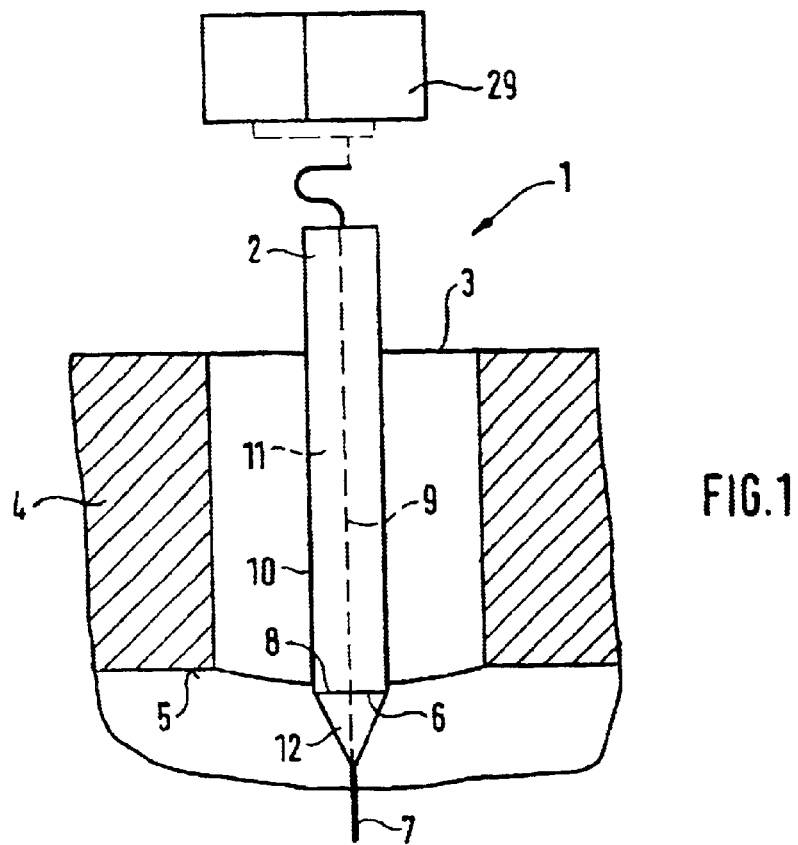
FIG. 1: a schematic illustration of a first embodiment of the device of the invention.

FIG. 1 is a schematic illustration of a first embodiment of the level sensor 1 of the invention. The level sensor comprises a transceiver 29, a coaxial cable, an input unit 2, and a conductive element 7. The evaluation of the echo signals is done in an evaluation unit, not shown separately in FIG. 1.

Figure 2:
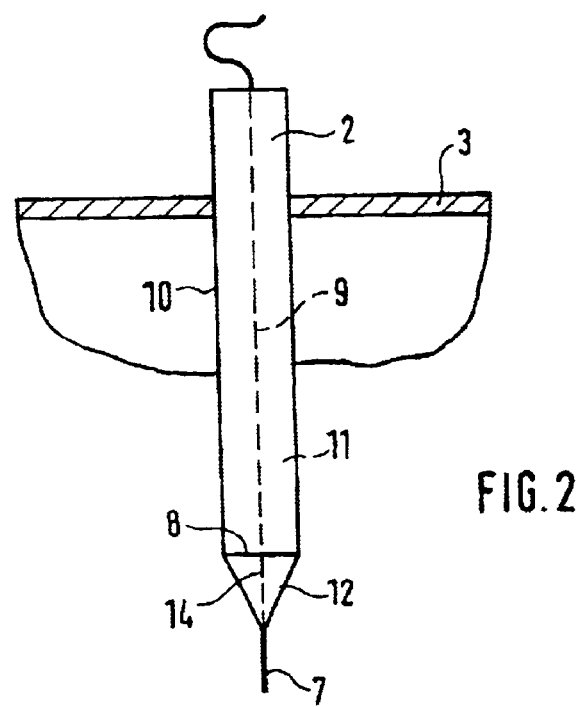
FIG. 2: a schematic illustration of a second embodiment of the device of the invention.

In the case shown, the input unit 2 has a length that is greater than the length of the connection stub 4. The input unit 2 is disposed such that the opening 8 is in the vicinity of—in this case, below—the lower edge 5 of the connection stub 4. It is understood that the opening 8 can also be placed above the lower edge 5. Moreover, the opening 8 in the input unit 2 is dimensioned such that it is on the order of magnitude of the wavelength of the measurement signals guided by the level sensor 1. To a very great extent, the embodiment according to the invention prevents components of the measurement signals from entering the connection stub 4. Consequently, virtually no void resonances are excited, which is expressed in a considerable improvement in the measuring accuracy of the level sensor 1. In the case shown, the three-dimensional region between the inner conductor 9 and the outer conductor 10 is furthermore filled with a dielectric material 11. The advantages of this embodiment have already been explained at length above and will not be repeated here. To increase the directional action of the level sensor 1, the dielectric material 11 is tapered, from the transition region 6 between the input unit 2 and the conductive element 7 onward. It is understood that the taper 12 can have the most various embodiments. In FIG. 2, a schematic illustration of a second embodiment of the device of the invention is shown, which essentially differs from the version shown in FIG. 1 only in that it is disposed not in a connection stub 4 but rather directly on the contained wall 3. The advantages of this embodiment of the invention have also already been addressed in detail above.

Figure 3:
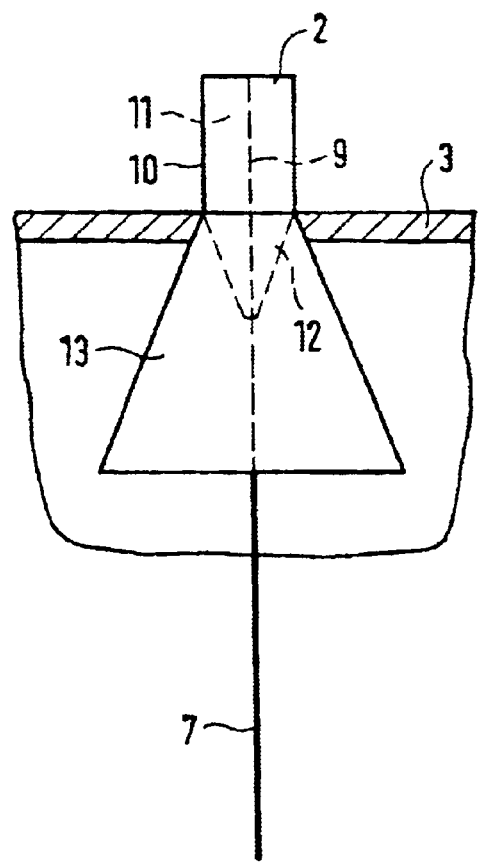
FIG. 3: a schematic illustration of a third embodiment of the device of the invention.

A schematic illustration of a third embodiment of the device of the invention can be seen in FIG. 3. Here, the transition region 6 between the input unit 2 and the conductive element 7 is disposed such that it is located virtually in the plane of the container wall 3. The input unit 2 has an inner conductor 9 and an outer conductor 10. Between the two parts, a dielectric material 11 is disposed. The dielectric material 11 of the input unit 2 is tapered, approximately from the transition region 6 "input unit 2—conductive element 7" onward, and an upper portion of the conductive element 7 is disposed approximately in the region of the longitudinal axis of the taper 12. As the primary advantages of this embodiment, the excellent directional action, the short block distance, and the reduced risk of deposit formation can be named. To improve the directional action still further, the outer conductor 13 is widened, from the transition region 6 "input unit 2—conductive element 7" onward, into a horn-shaped element 13.

Figure 4:
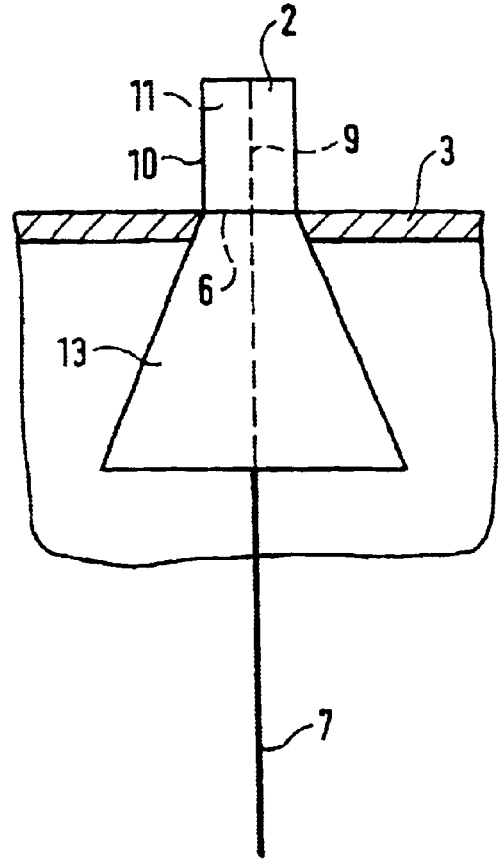
FIG. 4: a schematic illustration of a fourth embodiment of the device of the invention.

In FIG. 4, a schematic illustration of a fourth embodiment of the device of the invention is shown. Once again, the transition region 6 "input unit 2—conductive element 7" is disposed such that it is located virtually in the plane of the container wall 3. The input unit 2 comprises an inner conductor 9 and an outer conductor 10, and a dielectric material 13 can be found between the inner conductor 9 and the outer conductor 10. As already noted above, it is unnecessary for the dielectric material 11 to fill the entire three-dimensional region between the inner conductor 9 and the outer conductor 10. The outer conductor 10 of the input unit 2 is widened, approximately from the transition region 6 "input unit 2—conductive element 7" onward, in such a way that it forms a horn-shaped element 13. An upper portion of the conductive element 7 is disposed approximately in the region of the longitudinal axis of the horn-shaped element 13. Since the advantages of this embodiment have already been described at length above, it suffices at this point to list them briefly: improved directional action, reduced field distortion at the transition region 6 "input unit 2—conductive element 7", and thus an increased transmission rate and greatly reduced risk of deposit formation.

Figure 5:
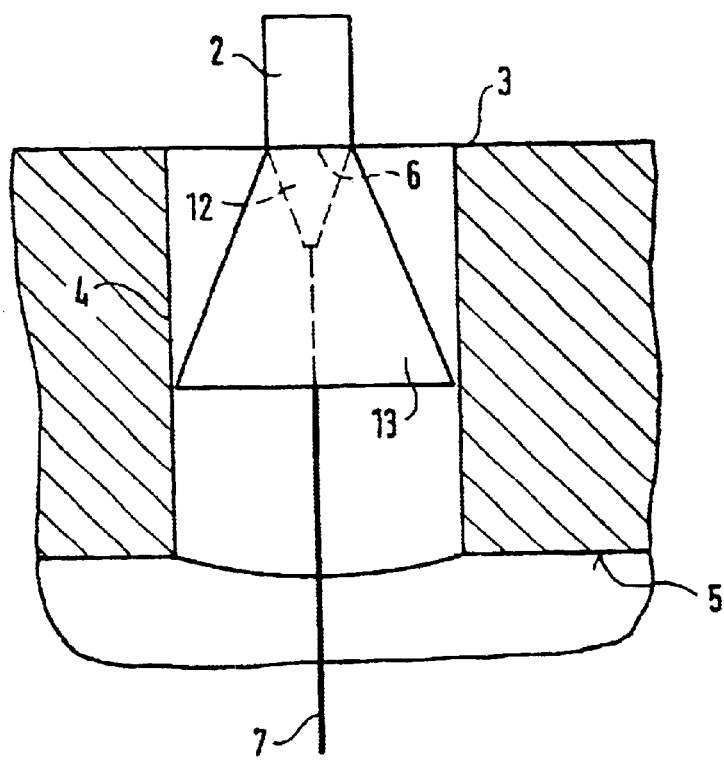
FIG. 5: a schematic illustration of an advantageous version of the embodiment of the device of the invention shown in FIG. 3.
Figure 6:
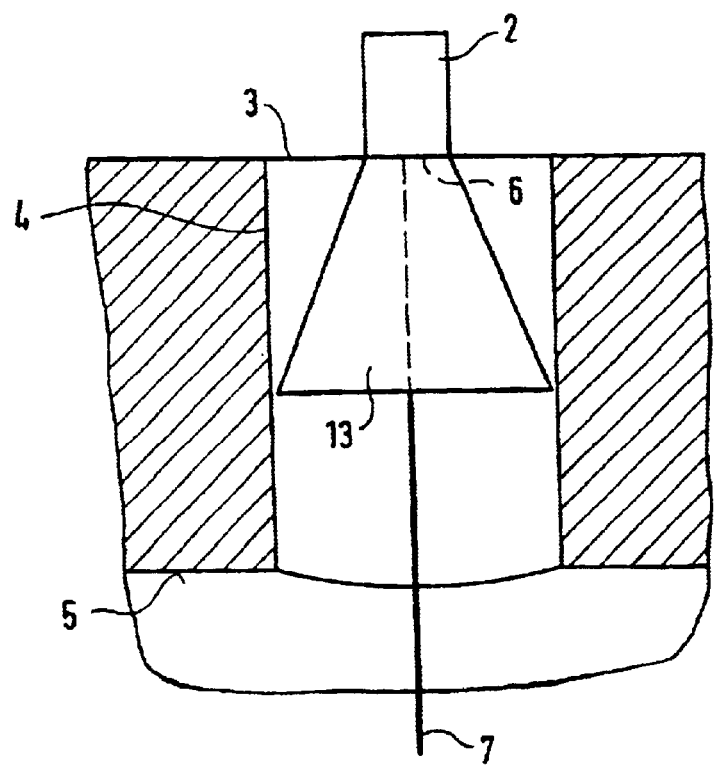
FIG. 6: a schematic illustration of an advantageous version of the embodiment of the device of the invention shown in FIG. 4.

The embodiments shown in FIGS. 5 and 6 correspond to those of FIGS. 3 and 4, except that here the level sensors 1 are disposed in the connection stub 4 of a container 3.

It is quite favorable if the input unit 2 is placed in a greatly extended metal plate. The metal plate improves the electrical adaptation of the conductive element 7 and prevents the broadcasting of electromagnetic energy to the rear. The metal plate acts on the order of an electrical mirror.

Figure 7:
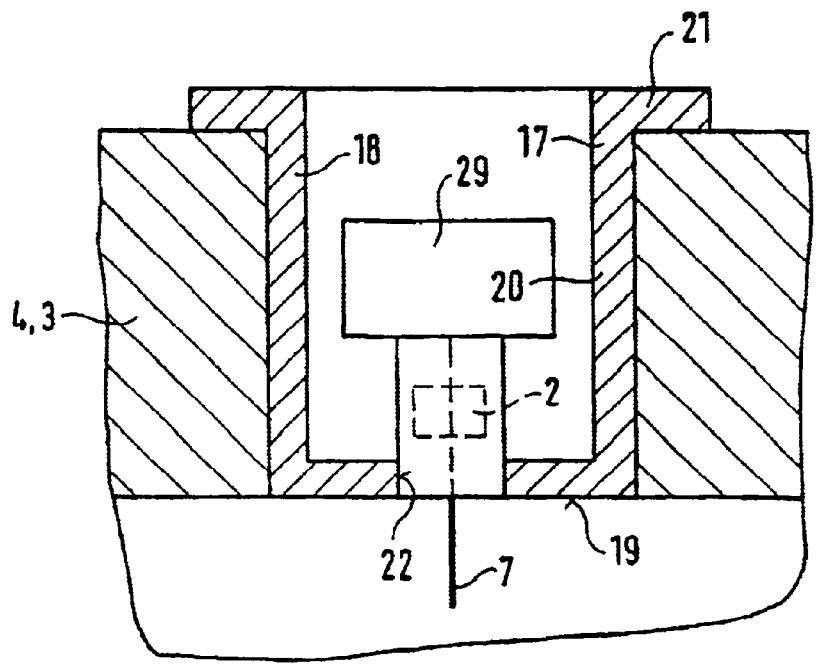
FIG. 7: a schematic illustration of a fifth embodiment of the device of the invention.

FIG. 7 is a schematic illustration of a fifth embodiment of the device of the invention. A connection stub 4 is provided in the container wall 3. A conductive material 20 is disposed on the side walls 17, 18 and in the region of the underside 19 of the connection stub 4. Preferably, this is a cup-shaped insert element 21, which is adapted to the dimensions of the connection stub 4.

The level sensor 1, comprising the transceiver 29, input unit 2, and conductive element 7, is embodied in this case shown as a compact sensor and is positioned in an opening 22 on the underside 19 of the cup-shaped insert element 21. The input unit 2 is positioned in the connection stub 4 in such a way that the transition region 6 "input unit 2—conductive element 7" comes to be located essentially in the plane of the container wall 3. It is understood that for the sake of exhausting the aforementioned advantages, it is also possible to provide a taper 12 and/or a horn-shaped element 13 in addition at the transition region 6 "input unit 2—conductive element 7".

Figure 8:
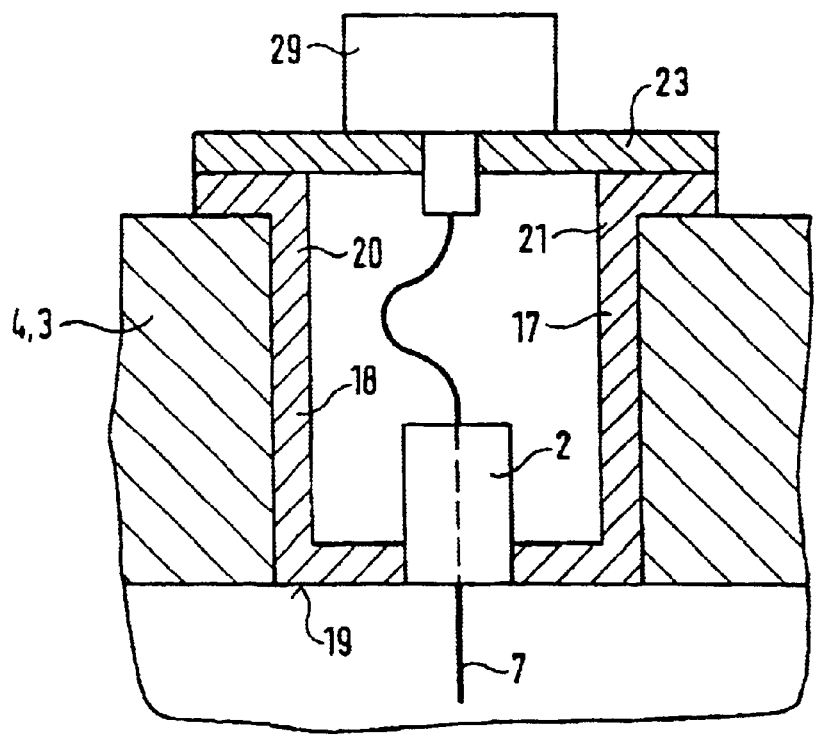
FIG. 8: a schematic illustration of an advantageous version of the embodiment of the device of the invention shown in FIG. 7.

FIG. 8 shows a schematic illustration of an advantageous version of the embodiment of the device of the invention shown in FIG. 7. It differs from the variant shown in FIG. 7 essentially only in the cover part 23, which closes off the cup-shaped insert part 21, disposed in the connection stub 4, from the outside. This version will always be used whenever the TDR sensor 1 on the one hand is to be protected against environmental factors, yet its control and display elements need to remain readily accessible.

Figure 9:
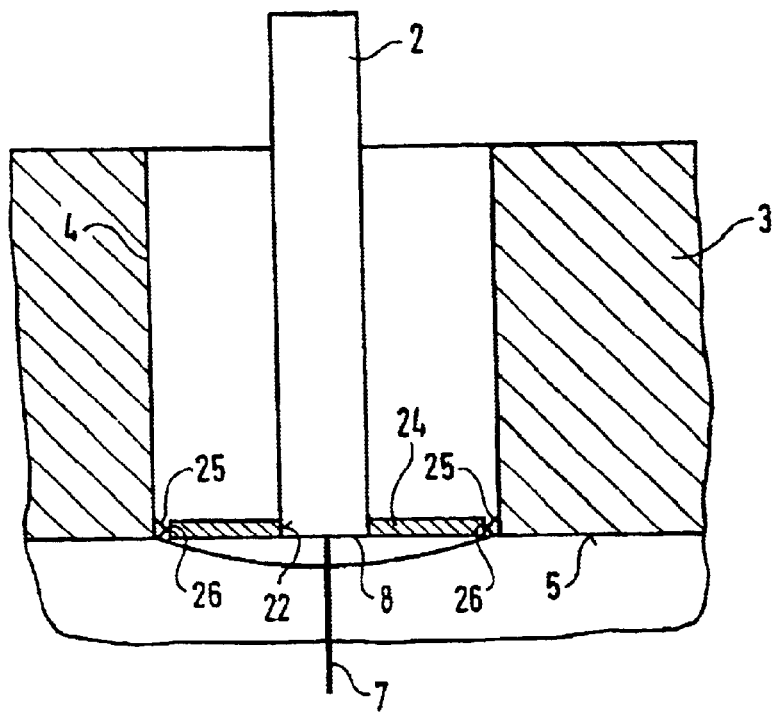
FIG. 9: a schematic illustration of a sixth embodiment of the device of the invention.

In FIG. 9, a schematic illustration of a sixth embodiment of the device of the invention can be seen, which is distinguished by low production costs. The input unit 2 has a length which is essentially equivalent to the length of the connection stub 4. The input unit 2 is positioned such that the transition region 6 "input unit 2—conductive element 7" is located approximately in the plane of the lower edge 5 of the connection stub 4. In the transition region 6 "input unit 2—conductive element 7", on the underside 19 of the connection stub 4, a platelike element 24 is disposed, which is electrically conductive at least on the side oriented toward the contents in the container. In the region of the outer edges 26 of the platelike element 24, connecting elements 25 of an electrically conductive material are provided. These connecting or contact elements 25 are preferably embodied resiliently. They assure a high-frequency-tight closure between the platelike element 24 and the connection stub 4, whose side walls 17, 18 are either made from an electrically conductive material or at least lined with an electrically conductive material. As a result, as already noted several times, the risk that some of the energy of the transmission signals will get back into the connection stub is reduced.

Figure 10:
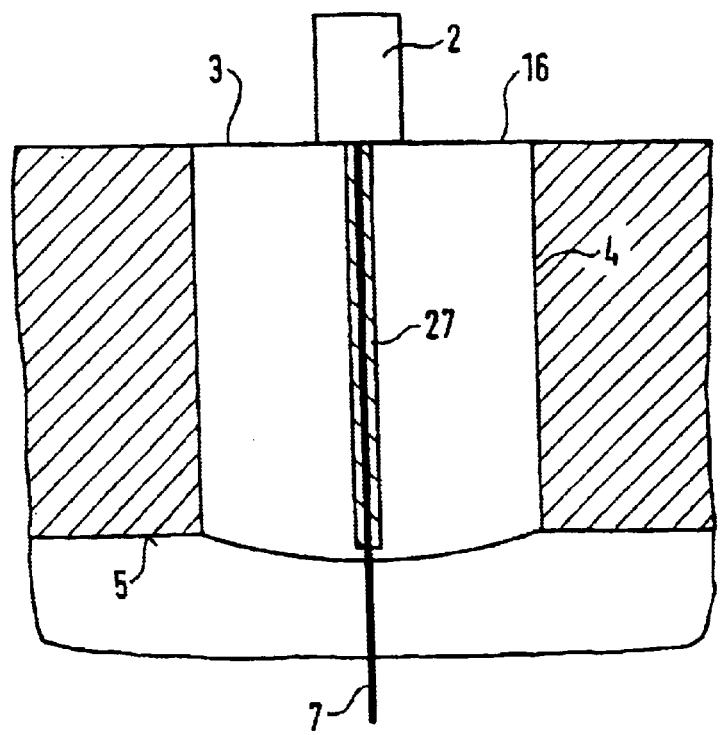
FIG. 10: a schematic illustration of a seventh embodiment of the device of the invention.

FIG. 10 shows a schematic illustration of a seventh embodiment of the device of the invention. The transition region 6 "input unit 2—conductive element 7" is disposed in the plane in which the top side 16 of the connection stub 4 is located. The conductive element 7 is modified, approximately over the length of the connection stub 4 (or in general terms, over the length that is equivalent to the distance between the corresponding container wall 3 and the lower edge 5 of the respective structural part or built-in part), in such a way that in this region, virtually no interactions occur between the measurement signals, guided along the conductive element 7, and the connection stub 4 (or in general the structural part). The version shown in FIG. 11 differs from the version shown in FIG. 10 only in that it is not secured in the region of a connection stub 4.

Figure 11:
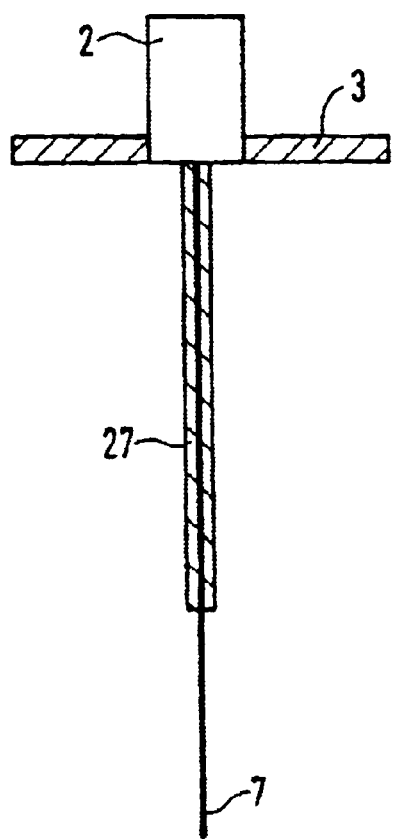
FIG. 11: a schematic illustration of an eighth embodiment of the device of the invention.

There are many possibilities by way of which—each taken by itself, or in combination with at least one other variant—the aforementioned goal can be attained:

The conductive element 7, at least in its upper region, is made from a material of low electrical conductivity and/or high magnetic permeability;

the conductive element 7, at least in the upper region, has a roughened surface structure;

the conductive element 7, at least in the upper region, has a surface structure by which the longitudinal inductance of the conductive element is increased;

the conductive element 7, as explicitly shown in FIG. 10 and FIG. 11, at least in the upper region, has an insulating layer 28, whose magnetic and/or dielectric properties are dimensioned such that the length of the electromagnetic fields is limited to the region at close range to the conductive element 7.

Figure 12:
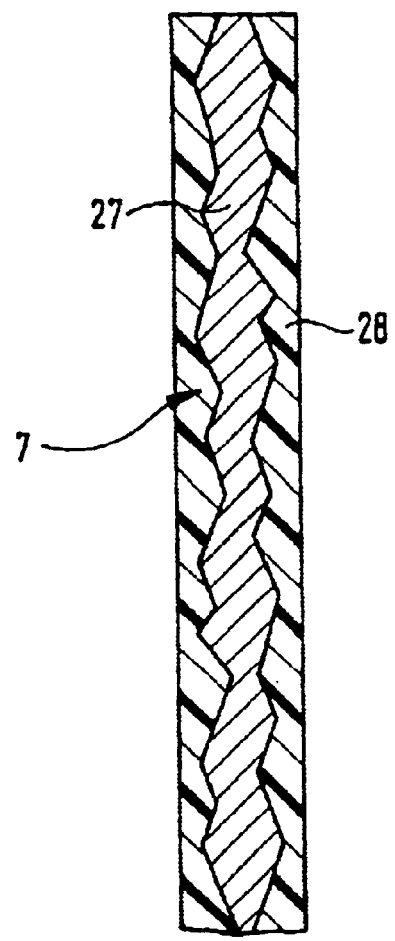
FIG. 12: a schematic illustration of a preferred version of the conductive element.

In FIG. 12, a schematic illustration of a preferred embodiment of the conductive element 7 can be seen. The conductive element 7 is made from a high-permeability material, the effect of which is only a slight field length of the service wave guided along the conductive element 7. In addition, the surface of the conductive element 7 is not smooth but instead has a roughened structure, which likewise contributes to a considerable field reduction. If for instance the surface of the conductive element 7 is made helical, then an increase in the longitudinal inductance is achieved. The wave resistance is increased, and the field length is reduced.

Moreover, at least in the region adjoining the input unit, the conductive element has an insulating layer 29, which has magnetic and dielectric properties adapted such that simultaneously the field length of the measurement signals guided along the conductive element 7 are reduced down to the desired amount. A further advantage of a sufficiently thick insulating layer 29 is moreover that the measuring accuracy of the level sensor 1 is virtually independent of any deposit formation.

What is claimed is:

1. A device for determining and/or monitoring the level of contents, or the location of the boundary face between two media or phases, in a container, in which on the container at least one structural part is provided, on which or in whose surroundings at least a sensor-associated part of the device is mounted, having;

a signal generating unit, which generates high-frequency measurement signals, said signal generating unit having an input unit and a conductive element, the measurement signals being input to said conductive element via said input unit; and a receiving/evaluating unit, which directly or indirectly via the transit time of the measurement signals, reflected from the surface or boundary face of the contents, determines the level of the contents or the location of the boundary face in the container, wherein:

said input unit has at least a length that corresponds essentially to the spacing from the container wall to the lower edge of the structural part and is positioned such that the transition region input unit—conductive element is located approximately in the plane of the lower edge of the structural part; and the diameter of the opening of said input unit at the transition region input unit—conductive element is on the order of magnitude of the wavelength of the high-frequency measurement signals.

2. A device for determining and/or monitoring the level of contents, or the location of the boundary face between two media or phases, in a container, having:

a signal generating unit, which generates high-frequency measurement signals, said signal generating unit having an input unit and a conductive element, the measurement signals being input to said conductive element via said input unit; and a receiving/evaluating unit, which directly or indirectly via the transit time of the measurement signals, reflected from the surface or boundary face of the contents, determines the level of the contents or the location of the boundary face in the container, wherein:

said input unit has a predetermined length, and is positioned in the container such that the opening of said input unit, pointing in the direction of the medium, has a certain spacing from the corresponding container wall; and the diameter of the opening of said input unit at the input unit—conductive element transition is on the order of magnitude of the wavelength of the high-frequency measurement signals.

3. The device of claim 1, wherein:

said input unit has an inner conductor and an outer conductor; and between said inner conductor and said outer conductor, in at least a partial region, a dielectric material is disposed.

4. The device of claim 1, wherein:

said dielectric material of said input unit is essentially tapered from the transition region input unit—conductive element onward, and an upper portion of said conductive element is disposed approximately in the region of the longitudinal axis of said taper.

5. The device of claim 1, wherein:

said outer conductor of said input unit changes over, essentially from the transition region input unit—conductive element onward into a horn-shaped element, and an upper portion of the conductive element is disposed approximately in the region of the longitudinal axis of said taper.

6. A device for determining and/or monitoring the level of contents, or the location of the boundary face between two media or phases, in a container, having:

a signal generating unit, which generates high-frequency measurement signals, said signal generating unit having an input unit and a conductive element, the measurement signals being input to said conductive element via the input unit; and a receiving/evaluating unit, which directly or indirectly via the transit time of the measurement signals, reflected from the surface or boundary face of the contents, determines the level of the contents or the location of the boundary face in the container, wherein:

the transition region input unit—conductive element is located essentially in the plane of the container wall;

said input unit has an inner conductor and an outer conductor;

between said inner conductor and said outer conductor, in at least a partial region, a dielectric material is disposed; and said dielectric material of said input unit is essentially tapered from the transition region input unit—conductive element onward, and an upper portion of said conductive element is disposed approximately in the region of the longitudinal axis of said taper.

7. A device for determining and/or monitoring the level of contents, or the location of the boundary face between two media or phases, in a container, having:

a signal generating unit, which generates high-frequency measurement signals, said signal generating unit having an input unit and a conductive element, the measurement signals being input to said conductive element via said input unit; and a receiving/evaluating unit, which directly or indirectly via the transit time of the measurement signals, reflected from the surface or boundary face of the contents, determines the level of the contents or the location of the boundary face in the container, wherein:

the transition region input unit—conductive element is located essentially in the plane of the container wall;

said input unit has an inner conductor and an outer conductor;

between said inner conductor and said outer conductor, in at least a partial region, a dielectric material is disposed; and said outer conductor of the input unit changes over, essentially from the transition region input unit—conductive element onward into a horn-shaped element, and an upper portion of the conductive element is disposed approximately in the region of the longitudinal axis of the taper.

8. The device of claim 6, wherein:

said transition region input unit—conductive element is position essentially in the plane of the top side of a structural part, in particular a connection stub, provided on the container.

9. A device for determining and/or monitoring the level of contents, or the location of the boundary face between two media or phases, in a container, in which on the container at least one structural part, in particular a connection stub, is provided, in which at least the sensor-associated part of the device is mounted, having:

a signal generating unit, which generates high-frequency measurement signals, said signal generating unit having an input unit and a conductive element, the measurement signals being input to said conductive element via said input unit; and a receiving/evaluating unit, which directly or indirectly via the transit time of the measurement signals, reflected from the surface or boundary face of the contents, determines the level of the contents or the location of the boundary face in the container, wherein:

in the region of the side walls of the structural part and in the region of the underside of the structural part, a conductive material is disposed; and the transition region input unit—conductive element is positioned approximately in the plane in which the lower edge of the structural part is located.

10. The device of claim 9, wherein:

a cup-shaped insert part is insertable into the connection stub, and said insert part is coated on at least one side with a conductive material, or said insert part is made from a conductive material.

11. The device of claim 9, wherein:

an opening for receiving the level sensor is provided on the underside of said insert part.

12. The device of claim 9, wherein:

a cover part is provided, which closes off the top side of the connection stub and said insert part.

13. A device for determining and/or monitoring the level of contents, or the location of the boundary face between two media or phases, in a container, in which on the container at least one structural part, in particular a connection stub, is provided, in or on the connection stub at least the sensor-associated part of the device is mounted, having:

a signal generating unit, which generates high-frequency measurement signals, said signal generating unit having an input unit and a conductive element, the measurement signals being input to said conductive element via said input unit; and a receiving/evaluating unit, which directly or indirectly via the transit time of the measurement signals, reflected from the surface or boundary face of the contents, determines the level of the contents or the location of the boundary face in the container, wherein:

said input unit has a length which is essentially equivalent to the pacing from the container wall to the lower edge of the structural part;

said input unit is positioned such that the transition region input unit—conductive element is located approximately in the plane of the lower edge of the structural part; and disposed on the underside of the connection stub in the transition region input unit—conductive element is a platelike element, which at least on the side toward the medium in the container is electrically conductive.

14. The device of claim 13, wherein:

electrical connecting elements are provided, which are disposed in the region of the outer edges of the platelike element and in the region of the connection stub.

15. A device for determining and/or monitoring the level of contents, or the location of the boundary face between two media or phases, in a container, in which on the container at least one structural part, in particular a connection stub, is provided, in or on the connection stub at least the sensor-associated part of the device is mounted, having:

a signal generating unit, which generates high-frequency measurement signals, said signal generating unit having an input unit and a conductive element, the measurement signals being input to said conductive element via said input unit; and a receiving/evaluating unit, which directly or indirectly via the transit time of the measurement signals, reflected from the surface or boundary face of the contents, determines the level of the contents or the location of the boundary face in the container, the transition region input unit—conductive element is disposed in the plane in which the top side of the structural part is located;

said conductive element is modified, approximately over the length of the structural part or over the length that is equivalent to the distance between the corresponding container wall and the lower edge of the structural part, in such a way that in this region virtually no interactions occur between the measurement signals, carried along said conductive element, and the structural part.

16. The device of claim 15, wherein:

at least the surface of said conductive element to at least the skin depth, at the measurement frequencies employed, over the length of the structural part or over the length that is equivalent to the distance between the corresponding container wall and the lower edge of the structural part, is made from a material of low electrical conductivity and/or high magnetic permeability.

17. The device of claim 15, wherein:

the surface of the conductive element, over the length of the structural part or over the length that is equivalent to the distance between the corresponding container wall and the lower edge of the structural part, has a roughened surface structure.

18. The device of claim 15, wherein:

the surface of said conductive element, over the length of the structural part or over the length that is equivalent to the distance between the corresponding container wall and the lower edge of the structural part, has a surface structure, by which the longitudinal inductance of said conductive element is increased.

19. The device of claim 15, wherein:

said conductive element, over the length of the structural part or over the length that is equivalent to the distance between the corresponding container wall and the lower edge of the structural part, has an insulating layer, whose magnetic and/or dielectrical properties are dimensioned such that the length of the electromagnetic fields is limited to the region at close range to said conductive element.

20. A device for determining and/or monitoring the level of contents, or the location of the boundary face between two media or phases, in a container, having:

a signal generating unit, which generates high-frequency measurement signals, said signal generating unit having an input unit and a conductive element, the measurement signals being input to said conductive element via said input unit; and a receiving/evaluating unit, which directly or indirectly via the transit time of the measurement signals, reflected from the surface or boundary face the contents, determines the level of the contents or the location of the boundary face in the container, the transition region input unit—conductive element is disposed in the plane of said container wall;

said conductive element, at least in the upper region, is made from a material of low electrical conductivity and/or high magnetic permeability; and/or said conductive element at least in the upper region has a roughened surface structure; and/or said conductive element at least in the upper region has a surface structure by which the longitudinal inductance of said conductive element is increased; and/or said conductive element at least in the upper region has an insulating layer, whose magnetic and/or dielectric properties are dimensioned such that the length of the electromagnetic fields is limited to the region at close range to said conductive element.

* * * * *